May 22, 1956 L. O. GREELEY 2,746,499
POWERED HAND PLANE
Filed May 3, 1952 3 Sheets-Sheet 2

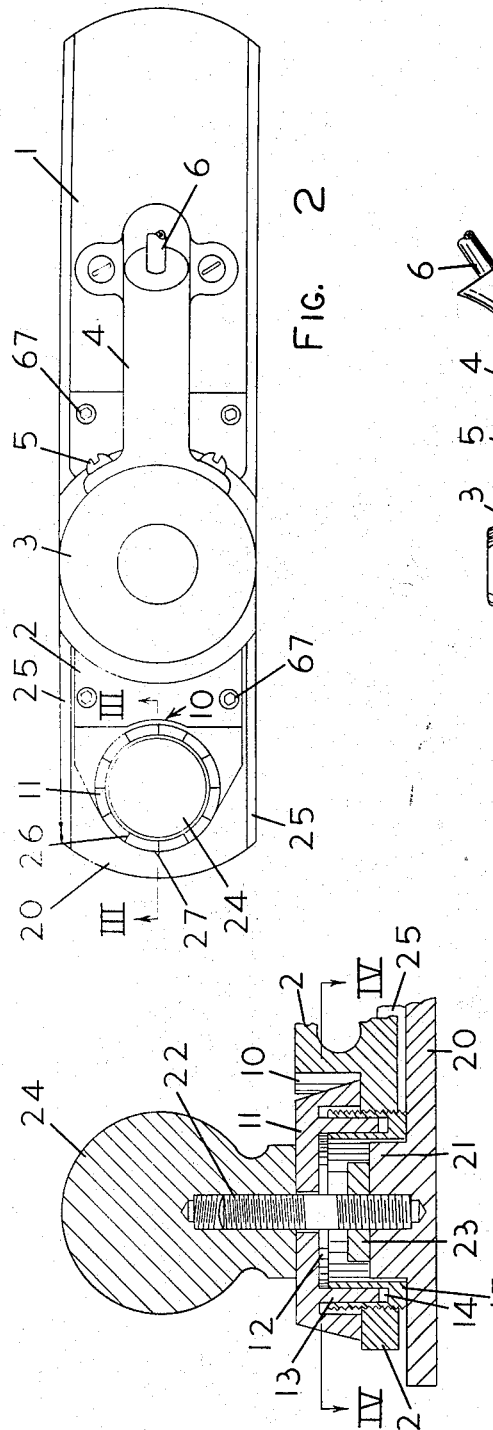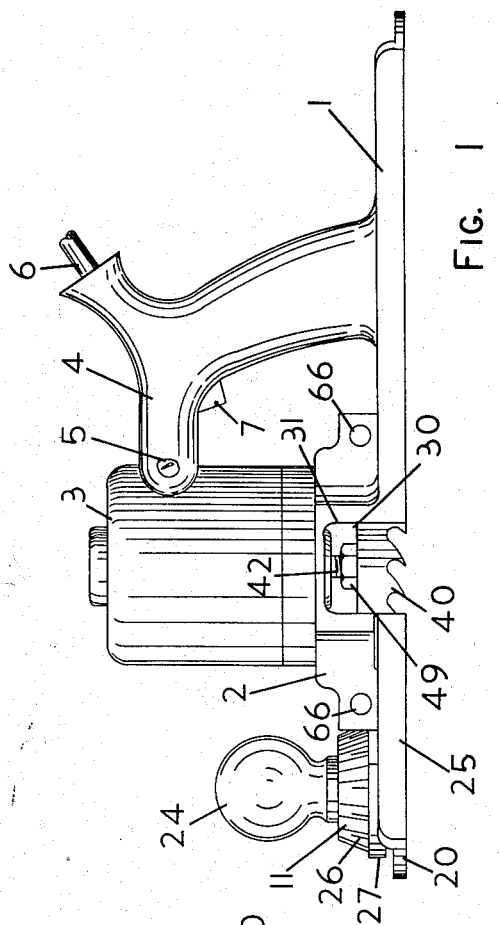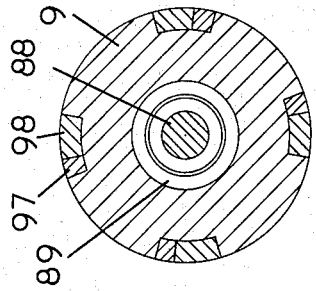
INVENTOR
LEO O. GREELEY
BY
ATTORNEY

INVENTOR
LEO O. GREELEY
BY *Peter P. Price*
ATTORNEY

May 22, 1956 L. O. GREELEY 2,746,499
POWERED HAND PLANE
Filed May 3, 1952 3 Sheets-Sheet 3
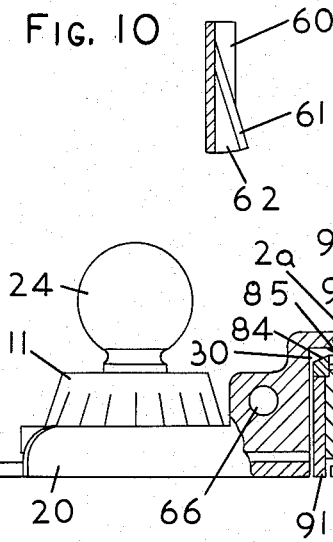
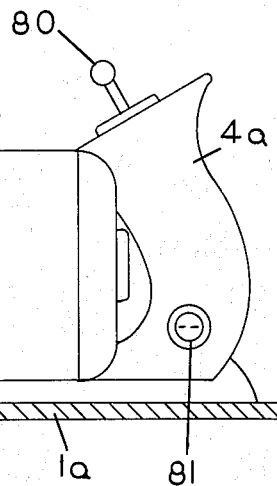
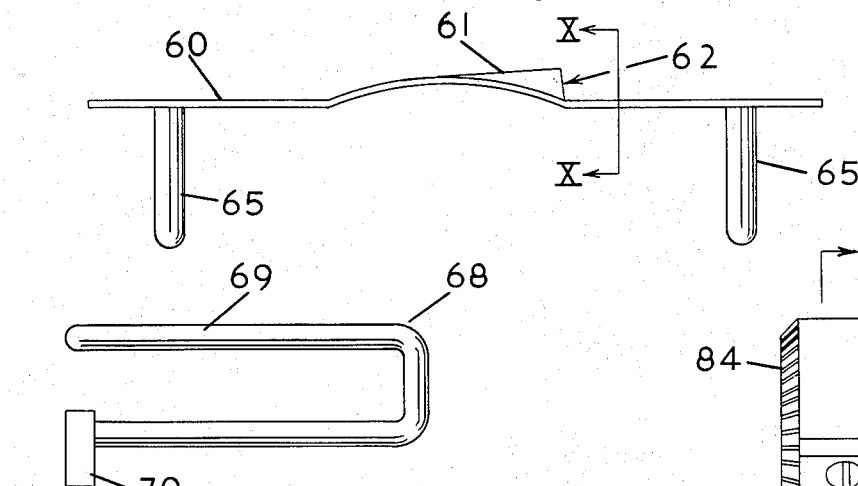
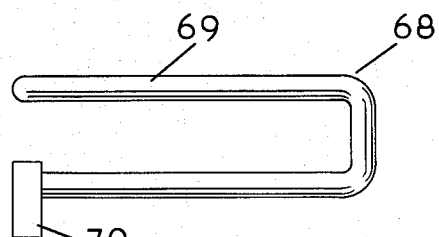
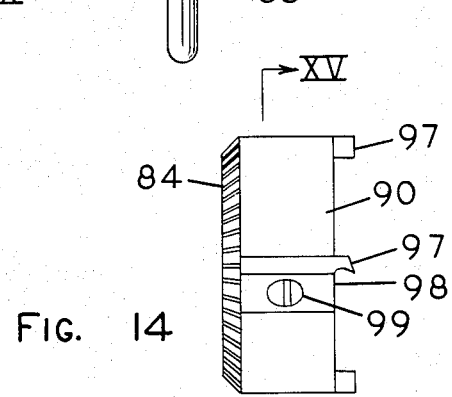
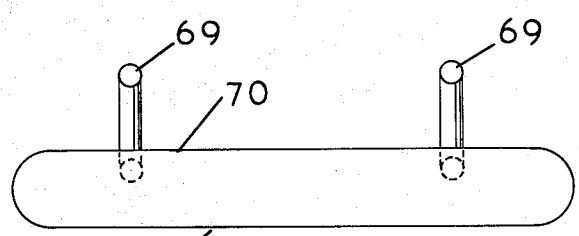
INVENTOR
LEO O. GREELEY
BY
ATTORNEY United States Patent Office 2,746,499
Patented May 22, 1956

2,746,499

POWERED HAND PLANE

Leo O. Greeley, Cadillac, Mich.

Application May 3, 1952, Serial No. 285,889

5 Claims. (Cl. 145—4.2)

This invention relates to carpenters' tools and more particularly to a power driven hand plane.

Numerous hand operated and power driven, manually portable, planing devices have been known and used for many years in the field of carpentry. These devices have, in general, had several limitations which it is the object of my invention to eliminate. My invention is designed to provide a tool suitable for rapid and precise adjustment through a wide range of cutting depths. Not only is the adjustment rapid and accurate but my plane is designed to immediately inform the operator of the exact depth to which the plane will cut. The tool is designed so that once the desired depth of cut has been established, the adjustment may be locked and thereafter accurately maintained throughout the working period.

My invention is designed to provide a plane adapted to cut the entire width of the plane body whereby it may be used not only as a conventional surface plane but as a rabbeting plane or as a jointer. This greatly extends the versatility of the tool.

It is a further object of my invention to provide a plane with an improved cutter blade assembly which will not gouge or scour the surface irrespective of the direction of the grain. In this manner, my invention provides a cutter which is always correctly aligned with the surface and will provide a finished cut having a smooth finish. In addition, my improved cutter assembly provides readily adjustable means whereby the support for the cutter may be adjusted as the depth of the cutter is reduced by repeated sharpenings.

These and other objects and purposes of my invention will be immediately seen by those acquainted with the construction and use of carpentry tools upon reading the following specification and the accompanying drawings.

In the drawings:

Figure 1 is a side elevation view of my invention.

Figure 2 is a plan view of my invention.

Figure 3 is an enlarged, fragmentary, central sectional view of the depth adjusting mechanism for my invention.

Figure 9 is a plan view of one of the chip guards for my invention.

Figure 10 is a sectional view taken along the plane X-X of Figure 9.

Figure 11 is an end view of a guide attachment for my invention.

Figure 12 is a side, elevation view of the guide attachment shown in Figure 11.

Figure 13 is a partial sectional, side, elevation view of a modified construction for my powered plane.

Figure 14 is a side, elevation view of the cutter assembly for my modified plane.

Figure 15 is a sectional view taken along the plane XV—XV of Figure 14.

In executing the objects and purposes of my invention, I have provided a primary base on which is mounted a handle supporting a vertical motor. The shaft of the motor mounts a horizontally rotatable cutter at its lower end. At the forward end of the plane there is provided a vertically adjustable secondary base for determining the depth of cut. The vertical position of the secondary base with respect to the primary base is indicated by a dial, rotation of which effects vertical adjustment of the secondary base. The forward gripping knob is used to lock the secondary base at the desired depth position. The cutter consists of a cup-shaped, circular blade, similar in construction to a hole saw having mounted therein a guide plate secured to the cutter shaft by ball bearings whereby the guide plate may remain stationary.

In the following description the terms "forwardly" and "rearwardly" are frequently used. The term "forwardly" shall be taken to mean toward the end of the plane having the depth adjustment dial or to the left in Figure 1 and "rearwardly" away therefrom.

Figure 5:
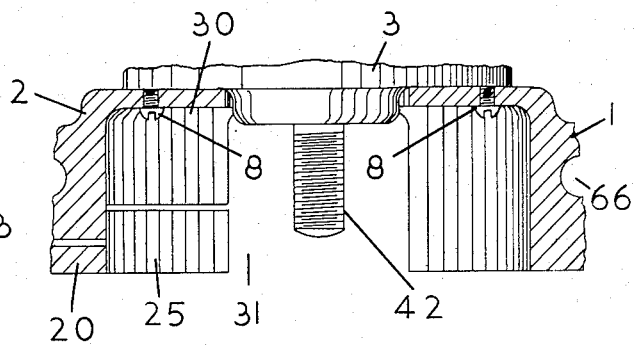
Figure 5 is a fragmentary sectional view of the base taken along the longitudinal centerline of the plane at the cutting chamber with the cutter assembly removed.

Referring now to the drawings in greater detail, the numeral 1 indicates a primary base member having a generally flat lower surface and a forwardly extending raised projection or arm 2. The primary base member together with the arm 2 constitute the primary frame or shoe of the plane. Within the rearward portion of the arm 2 there is a vertical opening for seating one end of a vertically mounted motor (Figure 5). The motor 3 is secured to the arm 2 by the screws 8 accessible through the bottom of the plane. The axis of the motor 3 is centered about the longitudinal centerline of the primary base 1. Intermediate the arm 2 and the rearward end of the base 1, a handle 4 is secured to the primary base 1. The upper end of the handle rigidly supports the motor 3 by means of the screws 5. Power for the motor enters the handle 4 through the cord 6 and operation of the motor is controlled by means of the hand switch 7 mounted in the handle. The motor 3 is indicated as an electrically operated motor but it will be recognized that a pneumatically driven motor could be substituted for an electric one without affecting the principle of my invention.

Figure 4:
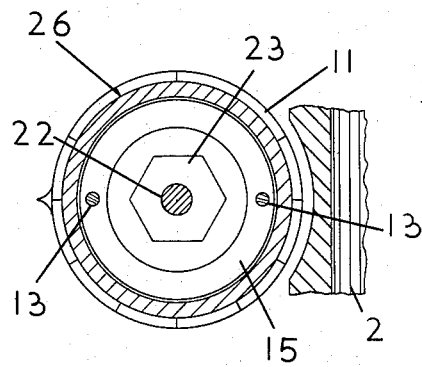
Figure 4 is a sectional view taken along the plane IV-IV of Figure 3.

The forward end of the arm 2 defines an upwardly opening cup 10 (Figure 3). Seated within the cup 10 is a circular dial 11 of generally trapezoidal cross-section. The lower face of the dial 11 defines a large, circular, central opening 12 within which depends a pair of diametrically spaced rods 13 (Figures 3 and 4). The rods 13 project downwardly substantially below the main body of the dial 11, and are each received into a suitable, circular, blind opening 14 in the ring 15. The ring 15 is externally threaded to engage the threaded opening in the arm 2 through which it passes. The rods 13, while locking the ring 15 and dial 11 together for simultaneous rotation, permit the ring 15 to move vertically with respect to the rods 13.

Mounted below the arm 2 and extending forwardly of the forward end of the arm and rearwardly to the opening within which the cutter blade operates is the forward shoe or secondary base 20. The secondary base, adjacent its forward end, is provided with a boss 21 adapted to seat within the central aperture of the ring 15. The upper surface of the boss 21 is provided with a blind, concentric, internally threaded opening into which is threadedly engaged the stud 22. The stud 22 is locked to the secondary base 20 by the locking nut 23. The stud 22 passes through a clearance opening in the dial 11 and at its upper end is threaded to receive the knob 24. Along each side, the secondary base 20 is provided with an upwardly extending flange 25 (Figures 1, 2 and 3) closely engaging the sides of the arm 2 and holding the secondary base in longiutdinal alignment with the primary base 1.

The dial 11 is equipped at its lower, outer periphery with a plurality of spaced indicia marks 26. These indicia marks cooperate with an indexing point 27 (Figure 2) on the extreme forward end of the arm 2 to indicate the depth of cut the tool will make at any particular setting of the dial.

Figure 6:
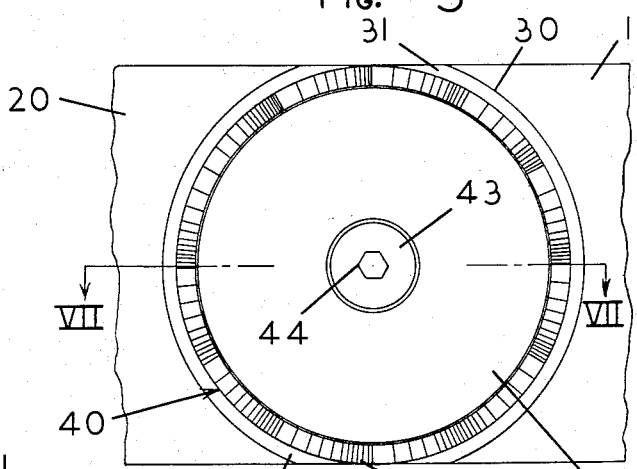
Figure 6 is a bottom view of the cutter assembly for my invention.

The rearward end of the secondary base 20 is concavely shaped. The forward end of the primary base is also concavely shaped and the rearward end of the arm 2 is provided with an internal cup-shaped opening corresponding with the concavities in the primary base 1 and secondary base 20 (Figures 5 and 6). This large, central, circular opening constitutes the cutting chamber 30 of the plane. The diameter of the cutting chamber 30 is somewhat greater than the width of the plane whereby at each side of the plane it opens through the side wall of the primary base 1 to provide a discharge opening 31 on each side. Within the cutting chamber 30 is mounted the cutter assembly 40.

Figure 7:
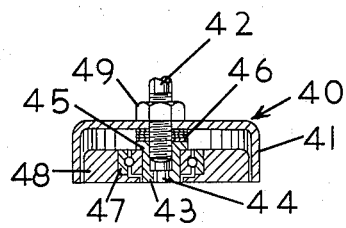
Figure 7 is a sectional view taken along the plane VII-VII of Figure 6.

The cutter assembly 40 consists of a cup-shaped cutter blade 41 having an external diameter equal to the width of the plane (Figures 6 and 7). The cutter blade 41 is centrally apertured to receive the end of the shaft 42 of the motor 3. The lower end of the shaft 42 is threaded to receive the internally threaded collet 43. The lower end of the collet is provided with a non-circular opening 44 for receiving an internal wrench. The upper end of the collet 43 has a shoulder 45. The collet 43 is spaced from the upper inside surface of the cutter blade 41 by means of a plurality of thin washers 46. The purpose of these washers will be explained under "Operation." Press fitted over the collet 43 and bearing against the shoulder 45 is a ball bearing assembly 47. The ball bearing assembly 47 is in turn press fitted into a circular guide plate 48. The guide plate 48 is of such diameter that it may be received within the central opening of the cutter blade 41 with, preferably, only sufficient clearance to eliminate any contact between these parts. The lower surface of the guide plate 48 is a large, smooth surface designed to rest upon the surface of the work being planed. The lower surface of the guide plate is at all times in the same horizontal plane as the ends of the teeth of the cutter blade 41.

The cutter blade 41 is secured to the shaft 42 for rotation therewith by means of the nut 49 which, when tightened, presses the cutter blade down securely against the washers 46, which in turn are held by the collet 43. It will be recognized that the cutter blade 41 may be provided with any of many various types of tooth design depending upon the type of cut desired. If a smooth finished surface is desired, one type of tooth design will be employed whereas if a rough surface, such as that suitable for gluing, is desired, a different type of tooth design will be employed.

Figure 8:
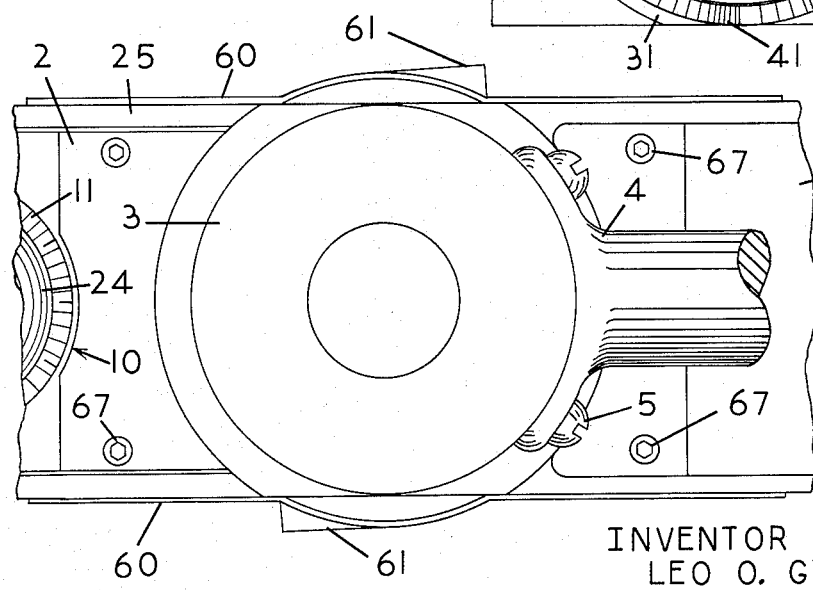
Figure 8 is a fragmentary plan view of my invention with the chip guards mounted thereon.

When the plane is not being used as a rabbeting plane, it may be provided with a chip guard 60 on each side (Figures 8, 9 and 10). The chip guards 60 each consist of a plate extending along the side of the plane and having an outwardly concave, central portion. From the central portion there extends a downwardly and outwardly projecting flange 61 defining a passageway 62 communicating with the cutting chamber 30 and generally tangential to the cutter assembly 40. The chip guard on one side directs the chips rearwardly and on the other side forwardly whereby they are both adapted to readily remove from the chamber the outwardly drifting, circulatory stream of chips powered by the rotating cutter assembly 40. Each of the chip guards is provided with a forward and a rearward peg. Each of the pegs 65 is received into one of the openings 66 (Figure 1) in the arm 2. The chip guards 60 are held in position by means of the set screws 67 which, when tightened, will engage the pegs 65 (Figures 2, 7 and 8).

When it is desired to control the lateral depth of cut of the plane, a guide element 68 consisting of a pair of U-shaped brackets 69 and a facer plate 70 are mounted to the plane (Figures 11 and 12). The upper ends of the U-shaped brackets 69 are seated within the same openings 66 used for the chip guards 60 and are locked in position by means of the same set screws 67.

*Modification*

In the modified construction of my plane shown in Figures 13, 14 and 15, the guide plate for the cutter is positively held against rotation and supported by a stationary shaft. Further, the motor is arranged horizontally. The forward end of the plane remains the same. The primary base member 1a remains substantially the same. The handle 4a is modified to provide the switch 80 at the top of the handle and the power cord 81 adjacent the base of the handle. The motor 82 is mounted horizontally to the primary base member 1a forward of and partially beneath the handle 4a. The motor shaft, at its forward end, mounts a bevel gear 83 which meshes with the hereinafter described bevelled, ring gear 84 of the cutter assembly 85. The forward arm 2a of the primary base member 1a is modified by providing a rearwardly extending hood portion 86 to house the bevel gear 83 and the shaft of the motor 82.

The cutter assembly 85 is mounted in the cutting chamber 30 and includes a circular guide 87 having a central, upwardly extending post 88. Seated about the post 88, adjacent the guide 87 are a pair of spaced bearings 89 mounting the blade holder 90. The blade holder 90 at its upper end securely seats within the ring gear 84. The blade holder 90 has a plurality of equally spaced, somewhat wedge-shaped channels 91 each seating one cutter 97 (Figure 15). Each of the cutters 97 is secured by means of a key 98 detachably held by a screw 99. The keys 98 are wedge-shaped to lock the cutters 97 into place. The cutters 97 may be extended downwardly from the blade holder to compensate for wear.

The upper portion of the post 88 is threaded to receive the threaded collar 92. The threaded collar 92, by means of external threads, engages the arm 2A as it passes therethrough. The threaded collar is locked in position by the nut 93. The post 88 is locked in position by the nut 94. The upper end of the post 88 is slotted 95 to facilitate adjustment thereof.

It will be recognized that the various parts constituting my plane may be made of any material depending upon the suitablility of the material for the function desired.

*Operation*

The plane is designed to be operated only while it is moving in a forward direction. As so operated, the secondary base 20 rests upon the surface of the uncut work and supports the forward end of the plane while the primary base rests upon the cut surface of the work and supports the rearward end of the plane. Since the cutter assembly 40 is at all times held in horizontal alignment with the primary base, irrespective of the position of the secondary base, the primary base is adapted to rest directly upon the cut surface of the work after the cutter blade has passed over the work. The cutter assembly 40 is adapted to cut to a depth exactly equal to the vertical differential between the primary and secondary bases, thus holding the shaft 42 perpendicular to the work and the lower surfaces of the plane parallel with the surface of the work. This arrangement provides the plane with a secure support and prevents the plane from gouging, jumping, vibrating or otherwise operating in a manner which will produce an unsatisfactory surface. The amount of vertical differential between the secondary base 20 and the primary base 1 determines the depth of cut of the plane since the cutter blade 41 is always horizontally aligned with the primary base.

To adjust the depth of cut the knob 24 is rotated to move it away from the dial 11. The dial 11 is then rotated thus rotating the ring 15, which in turn raises or lowers the secondary base 20 with respect to the arm 2 constituting the forward projection of the primary base 1. When the dial has been rotated to a point where it indicates by means of the indicia 26 that the desired depth of cut will be made, the knob 24 is rotated in the opposite direction to draw the secondary base 20 up tightly against the ring 15. At the same time, the knob 24 clamps the dial securely between the knob 24 and the surface of the cup 10. In this position, the knob 24 locks the dial against further rotation and holds the shoe or secondary base 20 rigidly to the primary base 1. Thereafter, the knob 24 serves as the forward grip of the plane while the handle 4 serves as the rearward grip of the plane. Operation of the motor 3 is controlled by means of the switch 7.

As the cutter assembly 40 is rotated and moved across the work, the circular guide plate 48 rests upon the cut surface passing beneath the cutter blade. Since the leading edge of the cutter blade 41 will do all the cutting, the guide plate 48 has a finished surface upon which to slide. Although the cutter blade 41 itself is rotating, the guide plates 48 remain stationary due to the substantially frictionless slip permitted by the ball bearing assembly 47. Since the guide plate 48 is stationary, it will not only have no tendency to gouge the planed surface but will be capable of providing a steady support and guide for the rotating cutter blade 41. The rotation of the cutter blade will, by centrifugal force, throw the chips outwardly in the cutting chamber 30. These chips will circulate until they reach one of the discharge openings 31 at which point they will leave the chamber permanently. When the chip guards 60 are in place, this stream of chips will be directed forwardly and rearwardly through the apertures 62 in the chip guards. The chip guards serve not only to funnel chips but they serve as guards to prevent the operator's hand coming in contact with the cutter blade. When, however, it is desired to use the plane for rabbeting, one of the chip guards cannot be used since it will prevent the cutter blade from reaching the full width of cut desired of the plane. When this occurs, the interfering chip guard 60 is removed by loosening the set screws 67. With the chip guard 60 removed, the plane will cut a channel the full width of the plane since the cutter blade 41 has a diameter equal to the width of the plane. The transverse depth of cut of the plane may be controlled by use of the element guide 68. The guide element is mounted by means of the brackets 69 seated in the openings 66 and secured by the set screws 67.

The cutter assembly 40 is made readily adjustable to overcome the changed vertical relationship between the guide plate 48 and the cutter blade 41, incident to repeated sharpening of the cutter blade 41. To this end, a plurality of thin washers 46 are initially provided between the collet 43 and the cutter blade 41 when the cutter blade 41 is first put in use. As the cutter blade 41 wears, sufficient washers 46 are removed to permit the guide plate 48 to move upwardly until its lower surface is again co-planar with the ends of the teeth of the cutter blade 41. Since the retreat of the teeth of the cutter blade 41 is slow, the washers 46 are preferably very thin whereby the removal of any one washer will effect only a small, vertical adjustment of the guide plate 48. When a worn out cutter blade 41 is replaced with a new cutter blade 41 all of the removed washers 46 are restored to their initial position between the collet 43 and the cutter blade 41. The washers removed from between the collet 43 and the cutter blade 41 may, for convenience, be stored between the cutter blade 41 and the nut 49. This procedure will eliminate adjusting the nut each time the cutter blade 41 must be lowered to restore its alignment with the primary base 1. This arrangement provides a quick and simple adjustment means for maintaining the guide plate 48 in horizontal alignment with the teeth of the cutter blade 41 and the cutter blade in horizontal alignment with the primary base 1.

The basic operation of the modified form of my plane shown in Figures 13, 14 and 15 is identical to that of the plane shown in Figures 1–12. The basic difference in these structures lies in the fact that in the modified structure, the guide 87 is positively held against rotation and supported by the post 88. By loosening the nut 93 and turning the threaded collar 92 the entire cutter assembly 85 may be raised or lowered to bring the face of the guide 87 into horizontal alignment with the lower face of the primary base member 1a. When the proper relationship has been established the cutter assembly may be locked into position by tightening the nut 93. To compensate for wear, the cutters 97 may be individually lowered by loosening the screws 99 to release the cutters sufficiently for vertical adjustment.

The use of a positively held, stationary guide 87 will produce a somewhat improved surface because it will prevent accidental gouging of the surface by the guide. At the same time, the post 88 provides a positive, fixed support for the cutter assembly preventing any tilting. This insures a smooth, accurate cut. Thus, both the guide 87 and the rotating cutter assembly are positively supported on a rigid post and thus are always coordinated. The combination of the rotary blades and the stationary cutter permits my plane to be used as a jointer. Because of the guide the tool will function properly when so used and thus has a much wider application than simply as a planing tool.

It will be recognized that numerous modifications of my invention may be made, each without departing from the principle thereof. Each of these modifications is to be considered as included in the hereinafter appended claims unless these claims by their language expressly provide otherwise.

I claim:

1. In a power operated plane having a base the improvement in said plane comprising: a post; means mounting said post to said base for axial adjustment, means to hold said post against rotation; a hollow circular cutter blade rotatably mounted on one end of said post; a stationary circular guide plate on said one end of said post and nested within said cutter blade, the surface of said guide plate being in the same plane as the ends of the teeth of said cutter blade.

2. In a power operated plane having a stationary base and a movable base and means for adjusting said movable base with respect to said stationary base, the combination comprising: a post between said stationary and movable bases, the axis of said post being parallel to the direction of movement of said movable base; means mounting said post to said stationary base for axial adjustment, means to hold said post against rotation; a hollow circular cutter blade rotatably mounted on one end of said post; a stationary circular guide plate on the lower end of said post and nested within said cutter blade, the surface of said guide plate and the ends of the teeth of said cutter blade being in the same plane as said stationary base.

3. In a power operated plane having a base, the improvement in said plane comprising: a post; one end of said post being externally threaded; an internally threaded collar on said base engaging said threaded end of said post whereby said post may be axially adjusted upon rotation thereof; a hollow circular cutter blade rotatably mounted about the other of the ends of said post; means locking said post against rotation under the urging of said cutter blade; a stationary circular guide plate on said other end of said post and nested within said cutter blade, the surface of said guide plate being in the same plane as the ends of the teeth of said cutter blade.

4. In a power operated hand plane the combination comprising: a rearward primary base; a forward secondary base parallel to said primary base, said secondary base being longitudinally aligned with said primary base; means for vertically adjusting said secondary base with respect to said primary base; a vertical post between said primary base and said secondary base; means on said primary base for mounting said vertical post between said primary and secondary bases; means for holding said post against rotation; a cutter blade assembly rotatably mounted on said post; said cutter blade having a diameter equal to the width of said plane; the lower end of said cutter blade assembly horizontally aligned with said primary base; a source of rotary motion for driving said cutter blade assembly; a stationary circular guide plate on said post and nested within the lower end of said cutter blade assembly, the lower surface of said guide plate being in the same horizontal plane as the ends of the teeth of said cutter blade assembly; the end of said post remote from said guide plate being externally threaded; an internally threaded collar engaging said threaded end of said post whereby said post may be vertically adjusted upon rotation thereof.

5. In a power operated hand plane the combination comprising: a rearward primary base; a forward secondary base parallel to said primary base, said secondary base being longitudinally aligned with said primary base; a rotatable member at the forward end of said primary base supporting said secondary base; said rotatable member threadedly engaging said primary base for effecting vertical adjustment of said secondary base; means on said primary base for mounting a vertical post between said primary base and said secondary base; means for holding said post against rotation; a cutter blade assembly rotatably mounted on said post; said cutter blade having a diameter equal to the width of said plane; the lower end of said cutter blade assembly horizontally aligned with said primary base; a source of rotary motion for driving said cutter blade assembly; a stationary circular guide plate integral with the lower end of said post and nested within the lower end of said cutter blade assembly, the lower surface of said guide plate being in the same horizontal plane as the ends of the teeth of said cutter blade assembly; the end of said post remote from said guide plate being externally threaded; an internally threaded collar engaging said threaded end of said post whereby said post may be vertically adjusted upon rotation thereof.

References Cited in the file of this patent
UNITED STATES PATENTS

| | | |
|---|---|---|
| 1,086,368 | Huyck | Feb. 10, 1914 |
| 1,527,785 | Carter | Feb. 24, 1925 |
| 1,703,179 | Skolnik | Feb. 26, 1929 |
| 1,812,755 | Quinsler | June 30, 1931 |
| 2,555,382 | Uschmann et al. | June 5, 1951 |
| 2,600,859 | Drysdale | June 17, 1952 |